United States Patent [19]

Koyama

[11] 4,010,515
[45] Mar. 8, 1977

[54] ANIMAL SKINNING APPARATUS
[76] Inventor: Nobuo Koyama, 238-8, Jone, Toride, Ibaragi, Japan
[22] Filed: Oct. 9, 1975
[21] Appl. No.: 621,251
[52] U.S. Cl. .................................................. 17/21
[51] Int. Cl.² ........................................ A22B 5/16
[58] Field of Search .............. 17/21, 50, 62, 16, 17, 17/52; 99/585, 587, 584, 588, 628; 83/4

[56] References Cited

UNITED STATES PATENTS

| | | | |
|---|---|---|---|
| 733,264 | 7/1903 | O'Brien | 17/21 |
| 2,261,589 | 11/1941 | Piper | 17/21 |
| 2,463,157 | 3/1949 | Deitrickson | 17/21 |
| 2,715,427 | 8/1955 | Townsend | 17/21 |
| 3,324,915 | 6/1967 | Townsend | 17/21 |
| 3,542,105 | 11/1970 | Townsend | 17/50 |

FOREIGN PATENTS OR APPLICATIONS

| | | | |
|---|---|---|---|
| 741,799 | 12/1955 | United Kingdom | 17/62 |

*Primary Examiner*—Louis G. Mancene
*Assistant Examiner*—James D. Hamilton

[57] ABSTRACT

An apparatus for skinning an animal is disclosed which apparatus permits skinning to be performed mechanically and comprises a roller table supporting the body of an animal and capable of moving in both elevational and tilting movements, a transfer and support table disposed adjacent the roller table, a guide roller disposed adjacent the transfer table, a cutter head mounting a cutter and juxtaposed against the guide roller for movement toward and away from the guide roller, and a pair of opposed rollers or two sets of endless chains disposed in a region beneath the line of contact between the cutter and the guide roller for pulling the skin stripped from the body of the animal by the cutter.

11 Claims, 4 Drawing Figures

ANIMAL SKINNING APPARATUS

BACKGROUND OF THE INVENTION

This invention relates to an animal skinning apparatus for skinning hogs, steers and other animals.

This apparatus will be described as being used to handle hogs. It should be understood, however, that this particular use of the apparatus is intended to be purely illustrative and not limiting in nature.

In one type of animal skinning apparatus known in the art, the body of a hog supported by the roller table has its skin gripped by a set of grippers at a straight cut made in the body longitudinally thereof (in a direction in which the spinal column extends), the set of grippers being mounted on the periphery of a drum, and a cutter is moved to a position in which it is disposed near and along the straight cut to strip the skin from the body of the hog as the drum is rotated to pull the skin and cause the body to rotate about the longitudinal axis thereof. When this type of apparatus is used, the stripped skin is wound around the drum, and the skin wound around the drum drops onto the skin collecting section disposed below the drum as the grippers are moved to their open position when the drum has made substantially one complete revolution.

Some disadvantages are associated with this type of skinning apparatus of the prior art. Since the apparatus are constructed such that the drum must be rotated in a reverse direction to return it to its original position after making substantially one complete revolution in the skin stripping step. This places limitations on the rate at which the stripping operation is performed. The forward end of the cutter must be disposed near the point of contact between a circle formed by the body of the hog and a circle formed by the drum when the relative positions of the hog body and the drum are seen in a transverse cross-section. The region of the apparatus near this point of contact is so narrow that it is impossible to effect adjustments of the position of the cutter such that the cutter can advantageously perform a stripping operation. The result of this is that the skin gripped at the cut relative to the body cannot be stripped by the cutter in a state in which the skin is pulled by a sufficiently high tensile force. Moreover, the apparatus of the prior art lack in precautions for the safety of the operator during operation.

In animal skinning apparatus of the prior art known in the art, the cutter is disposed in contact with the outer periphery of the body of an animal and arranged parallel to the longitudinal axis of the animal body. The cutting edge of the cutter is disposed between the skin and the flesh of the body. The cutting edge is sharp and this often causes the skin stripped from the body to become too large or uneven in thickness in case the tensile force exerted on the skin along its width is not uniform. Sometimes the skin is torn up before it is completely stripped.

SUMMARY OF THE INVENTION

This invention obviates the aforementioned disadvantages of the prior art. Accordingly, the invention has for its object the provision of an animal skinning appartus apparatus has increased overall performance in skinning animals because of increased operation speed and increased skin stripping speed and which is capable of increasing the safety of the operator in performing an animal skinning operation. One of the features of the invention lies in the use of two sets of chain grippers or a pair of roller grippers instead of the known gripper drum so that the skin can be gripped with a greater force and in a position which is adjustable. Another feature is that only one guide roller of a small diameter is used and disposed in close proximity to the cut made in the body of an animal to enable the forward end of a cutter to adjustably move to a position which is most suitable for stripping the skin from the body. The body of the animal which is first supported by a roller table is rotatably positioned between a transfer and support table and the cutter. The two sets of chain grippers or a pair of roller grippers are driven in one direction only without being able to reverse its direction of movement and grips an end portion of the animal at the cut made longitudinally of the body of the animal so as to pull the skin along a tangential line, the two sets of chain grippers or a pair of roller grippers being adapted to pull and deliver the skin as the skin is stripped from the body by the cutter. Thus the skin to be stripped from the body of the animal is guided by the guide roller, and then uniformly tensioned by the two sets of endless chains or a pair of rollers which serve as skin pulling and delivering means. The cutter is arranged such that the cutting edge thereof which is brought into contact with the body of the animal is disposed at an angle of over about 90° between the skin and the layer disposed underneath the skin.

In accordance with the invention, the cutter and a guide table for guiding the body of the animal may be provided with means for supplying liquid thereto to facilitate cleaning of the cutter and the guide table. This permits the waste liquid and the fat released from the body onto the cutter and the guide table to be quickly withdrawn from this zone, with the result that the cutter edge can be made to act efficiently at all times and the body of the animal from which the skin is stripped can be kept clean.

DESCRIPTION OF A PREFERRED EMBODIMENT

Figure 1:
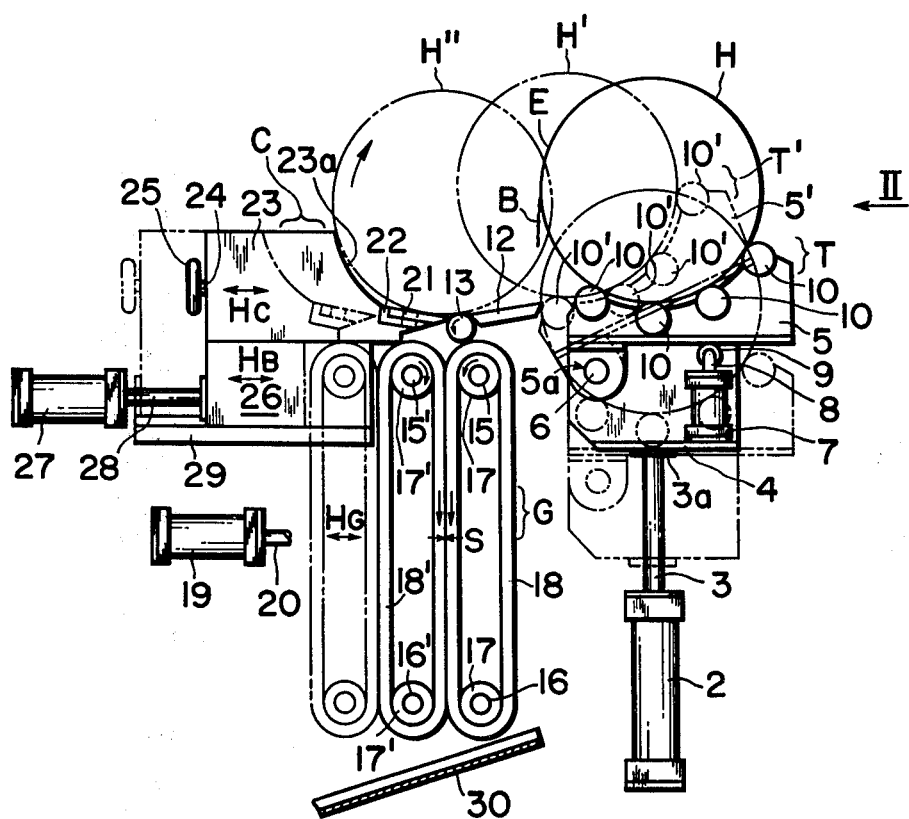
FIG. 1 is a transverse sectional view of the animal skinning machine according to the invention taken along the line I—I of FIG. 2.

An embodiment of the one shown in FIG. 1 and FIG. 2 will now be described. As shown, the novel mechanisms in accordance with the invention are mounted between right and left side plates 1, 1. Disposed adjacent the right and left side plates 1, 1 and inwardly thereof are pressure medium driven cylinders 2, 2 each having inserted therein a piston rod 3 which is secured by a screw to the bottom of a support frame 4 through a flange 3a. Thus the support frame 4 is supported by the piston rods 3 in two positions. The support frame 4, which is substantially in the form of a letter U in transverse cross-section, is formed with perforations 4a, 4a in upright portions thereof which are juxtaposed against the right and left side plates 1, 1.

A roller support frame 5, which is disposed on the support frame 4, is also substantially in the form of a letter U in transverse cross-section and formed with perforations 5a, 5a in upright portions thereof which are juxtaposed against the right and left side plates 1, 1. A support shaft 6 extends through the perforations 4a, 4a formed in the support frame 4 and the perforations 5a, 5a formed in the roller support frame 5, so that the support frame 4 and roller support frame 5 are pivotally supported by the support shaft 6.

A pressure medium driven cylinder 7 is secured to the inner side of one of the upright portions of the support frame 4 (if necessary, one cylinder may be provided to the inner side of each upright portion). A roller 9 is rotatably mounted on an upper end portion of the piston rod 9, so that the piston rod 8 supports the bottom of the roller support frame 5 through the roller 9.

A number of rollers 10 are mounted on the roller support frame 5. The rollers 10 are arranged such that the envelope of the outer circumferential surfaces thereof substantially agrees with the radius of curvature of a hog body H, each roller 10 being rotatably supported by upright portions of the roller support frame 5 at journals 11 at opposite ends thereof. The rollers 10 and the roller support frame 5 constitute a roller table T for supporting the hog body H. A transfer and support table 12 extending between the side plates of machine frame is secured thereto in such a manner that its left end is slightly lower than its right end with respect to the horizontal as shown in FIG. 1. Disposed adjacent the transfer and support table 12 is a guide roller 13 which is supported by the machine frame and driven to rotate at a peripheral velocity slightly lower than the rate at which chain means presently to be described is driven to move.

Sprocket shafts 15, 16 and 15', 16' are mounted below the guide roller 13 and rotatably supported by a frame (not shown) disposed inwardly of the side plates. Sprockets 17, 17 and 17', 17' which are identical in pitch circle diameter are secured to the sprocket shafts 15, 16 and 15', 16' respectively. Endless chains 18 are trained about the upper and lower sprockets 17, 17' while endless chains 18' are trained about the sprockets 17', 17'. The number of endless chains 18, 18' arranged axially may be selected to suit the particular condition. If necessary, the chains may be each provided with a tightener. The chains are provided with attachments, with a flat bar (not shown) being secured to the outer peripheral surface of the chain of each chain link. Thus the right and left sets of chains 18, 18' constitute chain gripper means G. In order that the right and left sets of chains 18, 18' may be operated synchronously, gears of the same pitch circle diameter are secured to the lower sprocket shafts 16, 16', for example. Thus, if the shafts 16, 16' are driven by a drive source (not shown), the two sets of chains move in the directions of arrows shown in FIG. 1.

The runs of the right and left sets of chains 18, 18' which are disposed in spaced juxtaposed relationship to one another have therebetween a space S which is adjustable depending on the thickness of the skin. Generally, the space S between the two sets of chains 18, 18' is set at 1.5 to 2.0 millimeters for the operation of stripping the skin. The set of chains 18' disposed on the left side in FIG. 1 is movable in the directions of arrows $H_G$ in FIG. 1 by the action of a pressure medium driven cylinder 19 and a piston rod 20 secured to an end plate (not shown). The movement of the set of the chains 18' in the direction of the arrows $H_G$ may take place either conjointly with the movement of a cutter head C presently to be described or independently thereof. This enables the hog skin to be gripped by chain gripper means G and discharged to a skin collecting plate 30. The links or attachments of the right and left sets of chains 18, 18' may be arranged such that they are indexed with one another or staggered in the direction of movement of the chains on the surfaces of the runs thereof which are juxtaposed against each other with the space S existing therebetween.

A cutter 21 is disposed above the two sets of chains 18, 18' such that its forward end faces the guide roller 13. The cutter 21 is secured through a cutter holder 22 to a cutter support 23. The cutter 21, cutter holder 22 and cutter support 23 constitute the cutter head C. The cutter support 23 is formed with a curved surface 23a of a radius of curvature which is substantially similar to that of the body of the hog H and adjustably secured to a base 26 for movement in the directions of arrows $H_C$ through a handle 25 and a spindle 24. The base 26 moves along guide rails 29 secured to the machine frame and can be moved in the directions of arrows $H_B$ by operating a piston 28 of a pressure medium driven cylinder 27. The movement of the base 26 in the directions of the arrow $H_B$ and hence the movement of the cutter head C in the directions $H_B$ can take place conjointly with or independently of the movement of one set of chains 18' (together with shafts 15', 16' and sprockets 17, 17') in the directions $H_G$.

Figure 3:
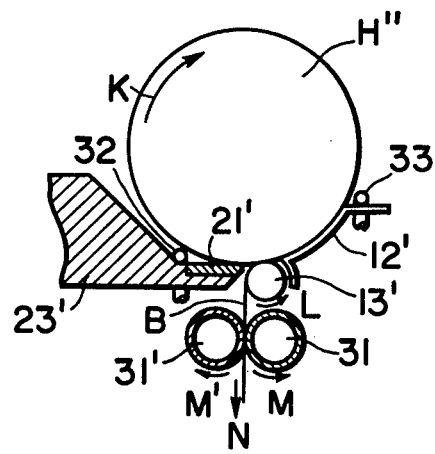
FIG. 3 is a transverse sectional view of the cutting portion of the skinning apparatus according to the invention.
Figure 4:
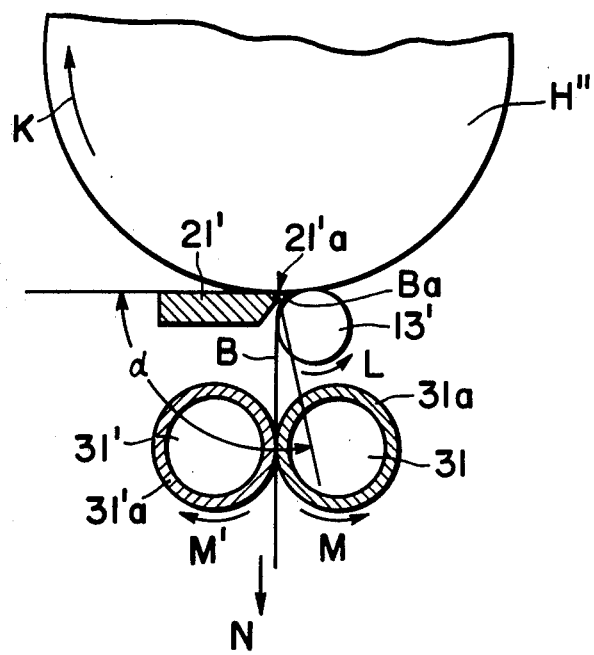
FIG. 4 is a fragmentary enlarged view of FIG. 3.

FIG. 3 and FIG. 4 show a modification of the invention in which a pair of guide rollers 31, 31' is used in place of the set of chains 18, 18'. As shown, the skin B to be stripped from the hog body H" shown in transverse section is first guided by the guide roller 13' disposed adjacent the outer periphery of the hog body H and parallel to the longitudinal axis thereof (normal to the plane of FIGS. 3 and 4), and then conveyed by skin pulling and delivering means consisting of the pair of rollers 31, 31' having secured thereto coatings 31a and 31'a respectively which are made of a synthetic material and knurled (not shown). The guide roller 13' and the pair of rollers 31, 31' can be operated by the same drive means through power transmission means (not shown). The hog body H" can be merely placed on the guide roller 13', cutter 21' and transfer and support table 12' without being moved, or can be supported by an auxiliary roller (not shown). The cutter 21' secured to the cutter support 23' is disposed along the outer periphery of the hog body H" and under the hog body. The cutter support 23' and the transfer and support table 12' are provided with liquid supply means 32, 33 which are connected to a liquid source through conduits (not shown). The liquid supplied through the liquid supply means 32, 33 may be guided, after being used, to a waste liquid trough (not shown) which is formed on the floor beneath the pair of rollers 31, 31'.

Referring to FIG. 4, the cutter 21' includes a cutting edge adapted to be brought into contact with the layer of the hog body H" beneath its skin which cutting edge is formed to have an angle $\alpha$ which is larger than about 90°.

Referring to FIGS. 3 and 4 again, the hog body H" rotates in the direction of an arrow K, the guide roller 13' rotates in the direction of an arrow L, the rollers 31, 31' of the skin pulling and delivering means rotate in the direction of arrows M and M' respectively, and the skin B is delivered in the direction of an arrow N.

The operation of the animal skinning apparatus constructed as afore-said will now be described. The roller table T is disposed in a lower position shown in dash-and-dot lines in FIG. 1 before the hog body H is placed thereon. After the hog body H is placed on the rollers 10 of the roller table T, the cylinders 2 are actuated to move the pistons 3 upwardly. This causes the roller table T to move to an upper position shown in solid lines in FIG. 1 and stops in such position. When the roller table T is moved to its upper position, the cylinder 7 is actuated and the piston 8 moves upwardly to move the roller support frame 5 upwardly through the roller 9. Thus the roller support frame 5 moves in pivotal motion about the support shaft 6, so that the roller table moves to a position T' shown in a finer line. Consequently, the rollers 10 move to the positions of rollers 10' and the roller support frame 5 moves to the position of roller support frame 5'. The movement of the roller table between its positions T and T' can be effected in stepless variation by means of the cylinder. With the roller table in the position T', the hog body is designated H' which can be moved to a next position H" by gravity or by being pushed by the operator. The hog body H" in this position is supported by the transfer and support table 12, guide roller 13, cutter 21 and the curved surface 23a of cutter support 23.

Figure 2:
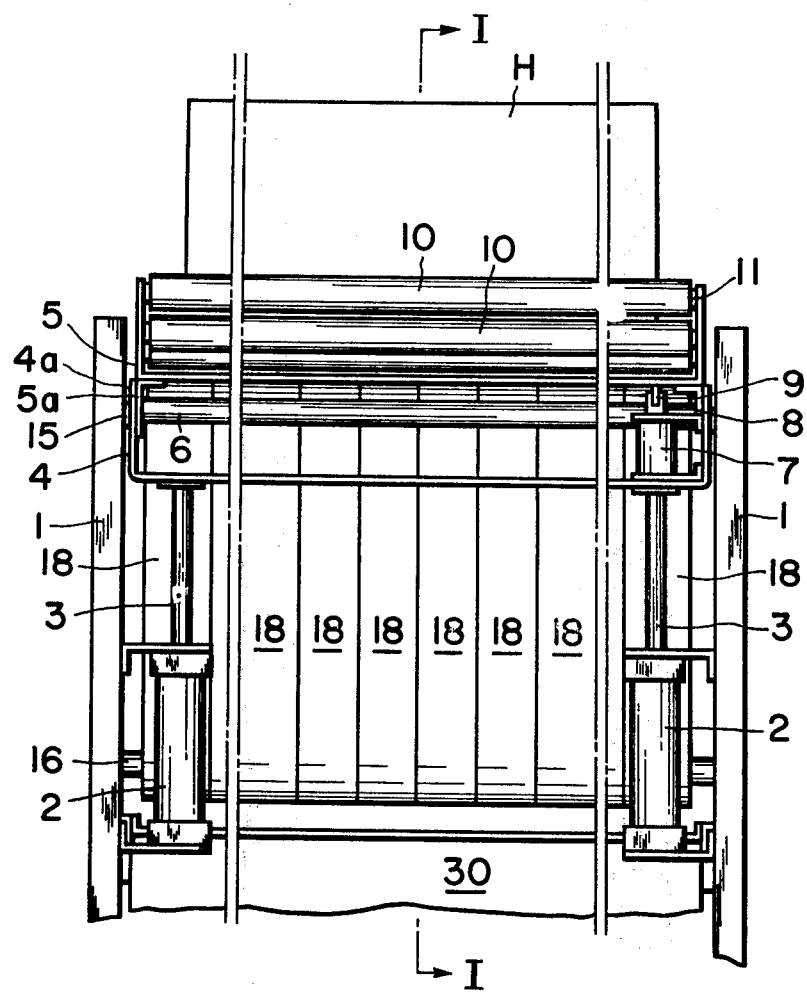
FIG. 2 is a front view as seen in the direction of II in FIG. 1.

When the hog body is disposed in the position designated H", the base 26 and hence the forward end of cutter 21 on the cutter head C are each disposed in a position shown in dash-and-dot lines in FIG. 1. Likewise, the set of chains 18' is in a leftward position shown in dash-and-dot lines. The operator moves the hog body H" so that the cut made therein may be disposed on the guide roller 13, and causes the skin B at the cut to depend downwardly along the outer periphery of the guide roller 13. Then the cylinders 19 and 27 are actuated to move the cutter head C and chains 18' rightwardly in FIG. 1 to their solid line positions. This results in the forward end of the cutter 21 being in contact with the outer periphery of the hog body H", while the chain gripper means G grips the skin B at the cut. The rightward and leftward movements of the cutter head C and chains 18' can be automatically effected and the positions in which they stop can be automatically adjusted by control means (not shown).

Upon completion of rightward movement of the cutter head C and chains 18', the chain gripper means G is rendered operative and then the guide roller 13 is made to rotate at a peripheral velocity which is slightly lower than that of chains 18, 18'. As a result, the skin is pulled downwardly in FIG. 1 by the chain gripper means G while the cutter 21 performs the action of stripping the skin from the hog body H" rotating in the direction of the arrow. The skin stripped from the body reaches the skin collecting plate 30, with the skin stripping operation being completed at a point E where the hog body H" has substantially made one complete revolution. Thereafter, the cutter head C and chains 18' move leftwardly in FIG. 1, while the roller table T is returned to the lower dash-and-dot line position. The piston 8 of the cylinder 7 is returned to its original position. The transfer and support table 12 may be advantageously formed to return the roller table T to its original position before the operation of stripping the skin from the hog body H" is started.

In the modification of the apparatus shown in FIGS. 3 and 4, the hog body H" is disposed on the guide roller 13', cutter 21' and transfer and support table 12', while the skin B is guided to pass between the cutter 21' and guide roller 13' and reaches a position in which it is disposed in the vicinity of the coatings 31a and 31'a of the rollers 31, 31'. By adjusting the cutter support 23', the position of the cutter 21' is set so that the cutter edge 21'a is brought into contact with the hog body H". Then the guide roller 13' and the pair of rollers 31, 31' are driven so as to bite the skin between the coatings 31a and 31'a of the rollers 31, 31a and pull and deliver the same in the direction of the arrow N. Meanwhile the cutter edge 21'a is brought into contact with the subcutaneous layer of the hog body H" but does not perform a cutting operation. Because of the fact that the peripheral velocity of the guide roller 13' is slightly higher than that of the pair of rollers 31, 31', the skin B shows a tendency to partially separate itself from the surface of the roller 13' as indicated at Ba in FIG. 4, and the cutter edge 21'a is operative to strip the skin B from the subcutaneous layer of the body, thereby stripping the skin B.

A liquid is supplied either intermittently or continuously through the liquid supply means 32, 33 to clean the cutter 21', transfer and support table 12' and the guide roller 13'. The liquid used for cleaning and the fat released from the body when the skin is stripped downwardly, are guided through the trough formed on the floor.

When the skinning apparatus according to the invention is used, the skin stripped from the hog body is thin because it does not contain the flesh of the subcutaneous layer of the body. Moreover, the skin stripped is uniform in thickness and can be prevented from being torn up during the stripping operation. This is made possible by the specific shape of the cutter edge, the operation of the guide roller and pulling and delivering means and the additional liquid supply means.

The pair of rollers 31, 31' used as skin pulling and delivering means may be replaced by drums provided on its periphery with grippers or chains. The cutter is shown as being disposed horizontally in FIGS. 3 and 4, but preferably the cutter is arranged in a suitably inclined position.

What is claimed is:

1. An animal skinning apparatus comprising a roller table for supporting the body of a hog or other like animal which can be moved in elevational movement and at the same time can be moved in tilting motion in a plane normal to its axis, a transfer and support table disposed adjacent said roller table, a guide roller disposed adjacent said transfer and support table, a cutter head mounting a cutter and juxtaposed against the guide roller, said cutter head being movable toward and away from the guide roller, and two sets of endless chains arranged beneath the line of contact between the cutter and the guide roller and adapted to pull the skin stripped from the body of the hog by means of the cutter.

2. An animal skinning apparatus as claimed in claim 1. wherein fine adjustments of the spacing between said two sets of endless chains can be effected, and one set of endless chains is capable of moving toward and away from the other set of endless chains a great distance.

3. An animal skinning apparatus as claimed in claim 2, wherein the movement of one set of chains toward and away from the other set of chains a great distance takes place conjointly with the movement of said cutter head toward and away from the guide roller.

4. An animal skinning apparatus as claimed in claim 1, wherein said cutter has a cutting edge which forms an angle of over about 90°.

5. An animal skinning apparatus as claimed in claim 1, wherein said cutter and said transfer and support table are provided with liquid supply means for supplying a liquid thereto to clean the same.

6. An animal skinning apparatus comprising a roller table for supporting the body of a hog or other like animal which can be moved in elevational motion and at the same time can be moved in tilting motion in a plane normal to its axis, a transfer and support table disposed adjacent said roller table, a guide roller disposed adjacent said transfer and support table, a cutter head mounting a cutter and juxtaposed against the guide roller, said cutter head being movable toward and away from the guide roller, and a pair of opposed rollers arranged beneath the line of contact between the cutter and the guide roller and adapted to pull the skin stripped from the body of the hog by means of the cutter.

7. An animal skinning apparatus as claimed in claim 6, wherein fine adjustments of the spacing between said two pairs of rollers can be effected, and one of the pair of rollers is capable of moving toward and away from the other roller a great distance.

8. An animal skinning apparatus as claimed in claim 7, wherein the movement of one of the pair of rollers toward and away from the other roller a great distance takes place conjointly with the movement of said cutter head toward and away from the guide roller.

9. An animal skinning apparatus as claimed in claim 6, wherein said cutter has a cutting edge which forms an angle of over about 90°.

10. An animal skinning apparatus as claimed in claim 6, wherein said cutter and said transfer and support table are provided with liquid supply means for supplying a liquid thereto to clean the same.

11. An animal skinning apparatus comprising a roller table for supporting the body of a hog or other like animal which can be moved in elevational motion and at the same time can be moved in tilting motion in a plane normal to its axis, a transfer and support table disposed adjacent said roller table, a guide roller disposed adjacent said transfer and support table, a cutter head mounting a cutter and juxtaposed against the guide roller, said cutter head being movable toward and away from the guide roller, and a pair of opposed rollers arranged beneath the line of contact between the cutter and the guide roller and adapted to pull the skin stripped from the body of the hog by means of the cutter, and means for providing fine adjustments of the spacing between said two pairs of rollers, one of the pair of rollers being capable of moving toward and away from the other.

* * * * *